US011078832B2

(12) United States Patent
Vuletic et al.

(10) Patent No.: US 11,078,832 B2
(45) Date of Patent: Aug. 3, 2021

(54) BEARING SYSTEM

(71) Applicant: BorgWarner Inc., Auburn Hills, MI (US)

(72) Inventors: Aleksandar Vuletic, Kirchheimbolanden (DE); Jason Robert Walkingshaw, Heidelberg (DE); Sascha Karstadt, Undenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/680,575

(22) Filed: Nov. 12, 2019

(65) Prior Publication Data
US 2020/0149466 A1 May 14, 2020

(30) Foreign Application Priority Data
Nov. 12, 2018 (DE) .......................... 102018219265.0

(51) Int. Cl.
*F02B 37/22* (2006.01)
*F02B 33/44* (2006.01)
*F16C 23/10* (2006.01)

(52) U.S. Cl.
CPC ............ *F02B 37/225* (2013.01); *F02B 33/44* (2013.01); *F16C 23/10* (2013.01)

(58) Field of Classification Search
CPC ........ F02B 37/22; F02B 37/225; F02B 37/24; F16C 23/10; F02C 9/20; F04D 27/002; F04D 27/003; F04D 27/0246; F04D 27/0253; F04D 29/24; F04D 29/242; F04D 29/245; F04D 29/247; F04D 29/42;
(Continued)

(56) References Cited

U.S. PATENT DOCUMENTS 5,076,484 A * 12/1991 Ito ........................... F01D 5/025
228/124.7
8,573,929 B2 * 11/2013 Lombard .............. F01D 17/105
415/145
2013/0251512 A1 9/2013 Lombard et al.
(Continued)

FOREIGN PATENT DOCUMENTS

| EP | 3480434 A1 | 5/2019 |
|----|------------|--------|
| JP | 2000087752 A | 3/2000 |
| WO | 2018045153 A1 | 3/2018 |

OTHER PUBLICATIONS

English language abstract and machine-assisted English translation for JP 2008-087752 extracted from espacenet.com and PAJ databases on Apr. 30, 2020, 35 pages.

*Primary Examiner* — Jesse S Bogue
*Assistant Examiner* — Loren C Edwards
(74) *Attorney, Agent, or Firm* — Howard & Howard Attorneys PLLC

(57) ABSTRACT

The present invention relates to an actuation device for a compressor inlet adjustment mechanism. The actuation device comprises a housing part and a lever assembly. The lever assembly comprises a bearing section, an input section and an output section. The output section is configured to be coupled to an adjustment ring of the adjustment mechanism on a first side of the housing part. The input section can be coupled to an actuator rod on a second side of the housing part. The lever assembly is rotatably mounted in the housing part via the bearing section on the compressor inlet side here.

21 Claims, 8 Drawing Sheets

(58) Field of Classification Search
CPC .. F04D 29/4206; F04D 29/4213; F04D 29/46; F04D 29/462; F04D 29/464
See application file for complete search history.

(56) References Cited

U.S. PATENT DOCUMENTS

2014/0377051 A1* 12/2014 Sun ..................... F01D 17/148
    415/1
2016/0169093 A1*  6/2016 Keller ..................... F02C 6/12
    60/605.1

* cited by examiner

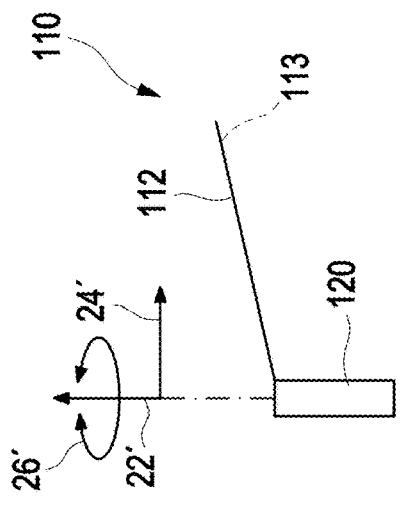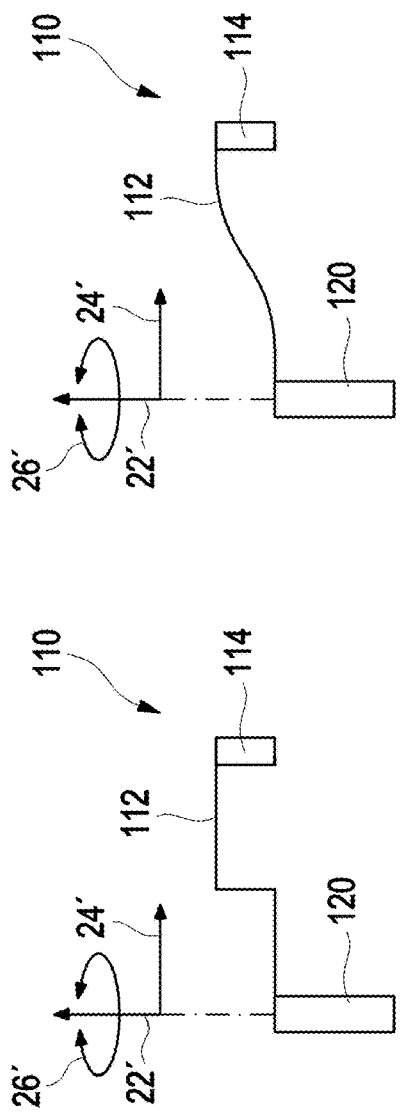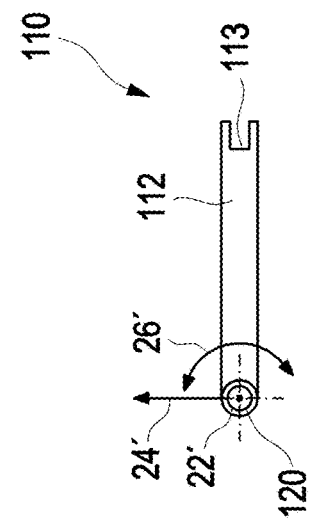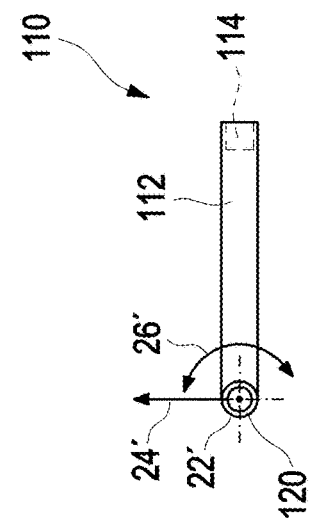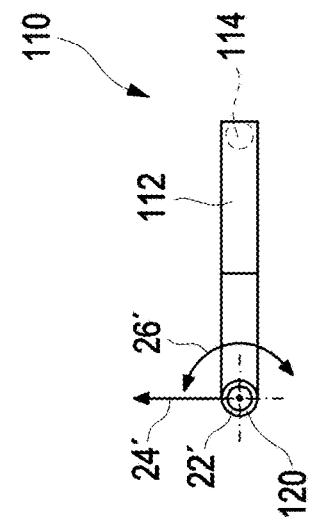
Fig. 4A  Fig. 4C  Fig. 4E
Fig. 4B  Fig. 4D  Fig. 4F

BEARING SYSTEM

CROSS-REFERENCE TO RELATED APPLICATIONS

This application claims the benefit of German Patent Application No. 102018219265.0 filed Nov. 12, 2018, the disclosure of which is herein incorporated by reference in its entirety.

TECHNICAL FIELD

The present invention relates to an actuation device for a compressor inlet adjustment mechanism. The invention further relates to an adjustment mechanism, a compressor and a charging device with such an actuation device and a method of assembling a compressor according to the invention.

BACKGROUND

More and more of the latest generations of vehicles are being fitted with charging devices in order to reach requirement targets and meet legal obligations. When developing charging devices, it is regarded as imperative to optimize both the individual components and the system as a whole in terms of their reliability and efficiency.

Known charging devices usually have at least one compressor with a compressor wheel which is connected to a drive unit via a common shaft. The compressor compresses the fresh air sucked in for the combustion engine or for the fuel cell. The quantity of air or oxygen which is available to the engine for combustion or to the fuel cell for reaction is thereby increased. This in turn leads to an increase in the performance of the combustion engine or the fuel cell. Charging devices can be fitted with different drive units. In particular, E-chargers in which the compressor is driven by an electric motor and exhaust gas turbochargers in which the compressor is driven by an exhaust gas turbine are known in the prior art. Combinations of the two systems are also described in the prior art.

Each compressor has a compressor-specific compressor map, the operation of the compressor being limited to the area of the compressor map between the surge limit and the choke line. Depending on the size and configuration of the compressor, operation may be inefficient or no longer possible at low volume flows through the compressor since the surge limit is reached.

In particular, compressors with adjustment mechanisms which are arranged in the inlet region of the compressor in the flow direction upstream of the compressor wheel are known in the prior art. Through the adjustment mechanisms, the flow cross section in the compressor inlet can be varied so that, for example, the flow speed and the volume flow to the compressor wheel can be set. This acts as a map-stabilizing measure through which, in turn, surging of the compressor can be reduced or avoided. Known systems often have actuators with linear actuation devices which have correspondingly large dimensions with a greater space requirement, from which design restrictions may result. Furthermore, in the case of known systems, there is an increased risk of an adjustment ring of the adjustment mechanism tilting during actuation. This may result in the adjustment ring and the entire adjustment mechanism being damaged.

The problem underlying the present invention is to provide an improved actuation device for a compressor inlet adjustment mechanism.

SUMMARY OF THE INVENTION

The present invention relates to an actuation device for a compressor inlet adjustment mechanism according to claim 1. The invention further relates to an adjustment mechanism according to claim 10, a compressor according to claim 12 and a charging device according to claim 13 with such an actuation device and a method of assembling a compressor according to the invention according to claim 14.

The actuation device for a compressor inlet adjustment mechanism comprises a housing part and a lever assembly. The lever assembly comprises a bearing section, an input section and an output section. The output section is configured to be coupled to an adjustment ring of the adjustment mechanism on a first side of the housing part. The input section can be coupled to an actuator rod on a second side of the housing part. The lever assembly is rotatably mounted in the housing part via the bearing section on the compressor inlet side here. Through the rotatable mounting of the lever assembly in the housing part, a compact actuation device can be provided. The possibility of individually coupling the output section to the adjustment ring and of individually coupling the input section to the actuator rod simplifies the assembly process and provides greater flexibility.

In configurations of the actuation device, a joined assembly can be formed through the bearing section and at least either the input section or the output section. In particular, this can be a joined assembly which is formed through a welded connection. Furthermore, a joined assembly can be formed through the bearing section and the other of either the input section or the output section respectively. This joined assembly can also be formed through a welded connection. Alternatively, the bearing section and the other of either the input section or the output section respectively can be configured together as one part. This means that the bearing section can be produced jointly with the input section or jointly with the output section from one part, for example in an originally forming process.

In configurations of the actuation device which can be combined with the preceding configuration, the joined assembly can consist of plastic material. Alternatively, the joined assembly can comprise a plastic material at least in a joining area, that is to say where the components of the joined assembly are joined to one another. The joined assembly can be produced here, in particular, in an ultrasonic welding process.

In configurations of the actuation device which can be combined with any of the preceding configurations, the output section can comprise a first lever arm with a first end region and a second opposite end region. The first lever arm is firmly connected to the bearing section via the first end region here. In other words, the output section is connected to a first end of the bearing section. As already mentioned, firmly connected can be understood here to mean a substance-to-substance bond such as via the joining methods referred to. Furthermore, depending on the configuration, the output section or the first lever arm can be configured as one part together with the bearing section. The output section or the first lever arm can also be connected to the bearing section via a screw connection or a press connection or other suitable joining methods.

In configurations of the actuation device which can be combined with any of the preceding configurations, the output section can be configured to be coupled to the adjustment ring via a pin or a similar elevation. More specifically, the pin can enter into operative engagement with a corresponding recess in the adjustment ring of the adjustment mechanism here. The pin can be arranged in the second end region of the first lever arm here. Through this particularly advantageous configuration, the risk of tilting of the adjustment ring can at least be minimized. Because the pin can engage into the recess of the adjustment ring, a force can be applied into the adjustment ring at the level of the adjustment ring. The pin can be configured as one part with the first lever arm here or can be joined to the first lever arm through a joining method, in particular a welding process.

Alternatively, the second end region of the first lever arm can also have a recess through which the output section can enter into operative engagement with a corresponding elevation (e.g. a pin) in the adjustment ring of the adjustment mechanism. This recess can, in particular, be configured to be fork-shaped here. In other words, the second end region can be configured such that it comprises a recess (e.g. a fork-shaped recess). This recess or the lever arm can be configured here such that the recess can be coupled directly to the adjustment ring via the surface of the latter. The risk of tilting of the adjustment ring can likewise be reduced hereby.

In configurations of the actuation device which can be combined with any of the preceding configurations, the input section and the output section can be mountable arranged at different angles α relative to one another. This means that the input section and output section can protrude from the bearing section in different directions with respect to the axis of rotation of the bearing section. The angle α can be between 0° and 180° here. The angle α is preferably approximately 0° or approximately 180°. The input section and the output section could alternatively or in addition also be arranged in other angular planes differently or, as it were, depending on the place of use or geometric conditions, relative to the bearing section.

This provides a certain degree of flexibility both in the assembly and in the field of application. For example, identical parts could be used for different geometric conditions, this offering cost benefits and enabling provision of a less expensive device.

In configurations of the actuation device which can be combined with any of the preceding configurations, the input section can comprise a second lever arm with a first end region and a second opposite end region. The second lever arm is firmly connected to the bearing section via the first end region here. In other words, the input section is connected to a second end of the bearing section. As already mentioned, firmly connected can be understood here to mean a substance-to-substance bond such as via the joining methods referred to. Furthermore, depending on the configuration and, as already mentioned in connection with the output section, the input section or the second lever arm can be configured as one part together with the bearing section. The input section or the second lever arm can also be connected to the bearing section via a screw connection or a press connection or other suitable joining methods.

In configurations of the actuation device which can be combined with any of the preceding configurations, the input section can be configured to be coupled to the actuator rod via a pin or a similar elevation. More specifically, the pin can enter into operative engagement with a corresponding recess (e.g. a bore or eye) in the actuator rod here. The pin can be arranged in the second end region of the second lever arm here. The pin can be configured as one part with the second lever arm here or can be joined to the second lever arm through a joining method, in particular a welding process.

Alternatively, the second end region of the second lever arm can also have a recess through which the input section can enter into operative engagement with a corresponding elevation (e.g. a pin) in the actuator rod. This recess can, in particular, be configured to be fork-shaped here. In other words, the second end region can be configured such that it comprises a recess (e.g. a fork-shaped recess).

In configurations of the actuation device which can be combined with any of the preceding configurations, the first lever arm and/or the second lever arm can be configured to be stepped, s-shaped or c-shaped or configured in the form of a spline. In particular, in the case of a stepped configuration, the corresponding pin (if present) can be oriented in the opposite direction to the step.

In configurations of the actuation device which can be combined with any of the preceding configurations, the bearing section can be configured to be cylindrical. As already mentioned, the bearing section can comprise a first end and a second end. The first end can be arranged on the first side of the housing part here and the second end can be arranged on the second side of the housing part here. End is to be understood here not just to be a (circular) surface finishing the bearing section, but a region which also serves for coupling to the input section or the output section. The output section can be arranged at the first end of the bearing section. The input section can be arranged at the second end of the bearing section. The bearing section can optionally comprise a circumferential groove. This circumferential groove can be formed through two cylindrical elevations and/or through a depression. The circumferential groove can, in particular, be arranged between the first end and the second end here. Through the cylindrical elevations, the frictional surface can be reduced while maintaining stability and the possibility of installing a sealing ring in the circumferential groove. This means that the bearing section can further comprise a sealing ring which is arranged in the circumferential groove. Alternatively or in addition, a circumferential groove and/or a sealing ring can also be arranged in the material surrounding the bearing section (e.g. bearing bushing or housing part). A plurality of circumferential grooves and/or sealing rings can also be provided in the bearing section and/or in the material surrounding the bearing section (e.g. bearing bushing or housing part).

In configurations of the actuation device which can be combined with any of the preceding configurations, the housing part can have a cylindrical section and a flange section (also referred to hereinbelow as a flange). In addition, the flange section can comprise a bore in which the bearing section is arranged. The bore can be arranged in different positions on the flange section between further inward in a radial direction and further outward in a radial direction here. In addition, the actuation device can comprise a bearing bushing in which the bearing section is rotatably mounted. The bearing bushing can be arranged in the bore of the housing part here. In preferable embodiments, the bearing bushing is pressed into the bore. Alternatively, the bearing bushing and the bore can have geometric features corresponding to one another in order to secure the bearing bushing rotationally and/or axially.

In configurations of the actuation device which can be combined with the preceding configuration, the bearing bushing can be made of a plastic material and, optionally, be injected into the bore of the housing part.

In configurations of the actuation device which can be combined with any of the preceding configurations, the lever assembly can be rotationally limited. This means that the actuation device can, for example, comprise geometric elements which are configured to limit a rotational adjustment path of the lever assembly. For this purpose, the geometric elements can, for example, be arranged in the bearing section and/or the bore of the housing part (or in the bearing bushing if present). Alternatively or in addition, the geometric elements, such as stoppers, can also be arranged on the flange section and/or on the input section and/or on the output section. For example, one or a plurality of stoppers can be arranged on the flange section through which the first and/or second lever arm are limited in their movement here. In particular, in alternative embodiments, a stopper can also be incorporated into the flange section in the form of a depression. This depression can, in particular, be configured as a substantially triangular depression. Depending on the embodiment, the first or the second lever arm can be inserted into this depression. The depression defines an angular range which limits a maximum movement of the output section (or the first lever arm) and/or input section (or the second lever arm). The configurations described above can prevent over-rotation of the adjustment ring and therefore lead to a more reliable actuation device. Furthermore, the risk of damage can hereby be reduced and an exact travel (and therefore adjustment path or degree of opening of the adjustment mechanism) can be set. In particular, the last-mentioned embodiments with a depression can lead to a more compact actuation device since the axial dimensions of the actuation device can be reduced, through the geometric "integration" of the output section (or the first lever arm) and/or of the input section (or the second lever arm) into the housing part, compared to a device in which the output section and/or the input section is arranged next to the housing part in a substantially axial direction.

The invention further relates to an adjustment mechanism for the variable adjustment of a compressor inlet. The adjustment mechanism comprises an adjustment ring and a plurality of orifice plate elements. The orifice plate elements are rotatably mounted and operatively coupled to the adjustment ring. The adjustment mechanism comprises an actuation device according to any of the preceding configurations.

In configurations of the adjustment mechanism, the adjustment mechanism can further comprise a bearing ring. The orifice plate elements can be rotatably mounted in the bearing ring. The bearing ring is configured to be arranged on a compressor housing. Alternatively, the orifice plate elements can be configured to be rotatably mounted directly in a compressor housing.

In configurations of the adjustment mechanism which can be combined with the preceding configuration, the adjustment ring can comprise a plurality of orifice plate recesses distributed in a circumferential direction for coupling to the orifice plate elements.

In configurations of the adjustment mechanism which can be combined with any of the preceding configurations, the adjustment ring can comprise at least one coupling recess for coupling to the lever assembly. The adjustment ring can preferably comprise precisely one coupling recess. Furthermore, the coupling recess can have a groove-shaped course in a substantially radial direction. In addition, a length of the groove-shaped coupling recess can be limited inwardly in a radial direction and/or outwardly in a radial direction. A sliding path of the pin of the output section can hereby be set and therefore (inter alia) a limitation of a rotational path of the adjustment ring can be determined.

In configurations of the adjustment mechanism which can be combined with the preceding configuration, the coupling recess can penetrate the adjustment ring in an axial direction. Alternatively, the coupling recess can merely be made in the adjustment ring. Alternatively or in addition, in configurations in which the output section comprises a pin, the pin can be operatively coupled to the coupling recess. Alternatively or in addition, the coupling recess can be arranged between two orifice plate recesses respectively in a circumferential direction. Where there is a plurality of coupling recesses, the coupling recesses can be distributed in different positions in a circumferential direction on the adjustment ring.

In configurations of the adjustment mechanism which can be combined with any of the preceding configurations and in which the second end region of the output section has a recess, the adjustment ring can comprise a coupling elevation which is operatively coupled to the recess of the second end region of the output section.

The invention further relates to a compressor which comprises a compressor housing and a compressor wheel arranged therein. The compressor housing defines a compressor inlet and a compressor outlet with a compressor volute. The compressor comprises an adjustment mechanism according to any of the preceding configurations.

In configurations of the compressor, the housing part can serve as an inlet nozzle of the compressor housing. The housing part can be formed integrally with the compressor housing or as a separate component here. Furthermore, the housing part can be attached to a flange face of the compressor housing on the compressor inlet side. More specifically, the housing part can be attached to the flange face of the compressor housing with the flange section.

In configurations of the compressor which can be combined with any of the preceding configurations, the compressor housing can have a depression coaxially surrounding the compressor inlet. This coaxial depression can be configured to accommodate the orifice plate elements, the adjustment ring and optionally the bearing ring (if present). The depression is arranged radially inside the flange face here. In other words, this means that the flange face outwardly surrounds the depression of the compressor housing substantially coaxially or in a radial direction. The flange face is raised relative to the depression in an axial direction here.

In configurations of the compressor which can be combined with any of the preceding configurations, the compressor can further comprise an actuator with an actuator rod. The actuator can be coupled to the lever assembly via the actuator rod.

The invention further relates to a charging device which comprises a drive unit and a shaft. Furthermore, the charging device comprises a compressor according to any of the preceding configurations. The compressor wheel of the compressor is coupled to the drive unit via the shaft here. The drive unit can comprise a turbine and/or an electric motor.

The invention further relates to a method of assembling a compressor which comprises the following steps:
Providing a compressor housing;
Providing an adjustment mechanism comprising:
Providing an actuation device comprising:
Providing a housing part, a bearing section, an input section and an output section;
Feeding the bearing section through a bore in the housing part;

Joining the bearing section to at least either the input section or the output section, preferably through a welding process; and Providing an assembly group consisting of a plurality of orifice plate elements, an adjustment ring and optionally a bearing ring;

Attaching the adjustment mechanism to the compressor housing.

In configurations of the method, the adjustment mechanism can be arranged in any desired rotational orientation with respect to the axis of rotation of the compressor before attachment.

In configurations of the method which can be combined with the preceding configuration, the actuation device and the assembly group can be provided independently of one another.

In configurations of the method which can be combined with any of the preceding configurations, the attaching of the adjustment mechanism can comprise first inserting the assembly group into the depression of the compressor housing and then fixing the actuation device to the compressor housing. Alternatively, the actuation device and the assembly group can be assembled together before attachment and jointly attached to the compressor housing.

In configurations of the method which can be combined with any of the preceding configurations, the bearing section together with either the input section or the output section can be provided as one part before the bearing section is then fed through the bore in the housing part and then joined to the other of either the input section or the output section. In other words, this means that either the input section or the output section can be provided as one part jointly with the bearing section. The bearing section (jointly with either the input section or the output section) can then be fed through the bore in the housing part and then joined to the other of either the input section or the output section. When feeding through the bore, of course only the bearing section itself is inserted into the bore. After being passed through or inserted, the section configured as one part with the bearing housing (input section or output section) can serve as a fixing aid when joining to the other section (input section or output section). This simplifies and speeds up the assembly process.

In configurations of the method which can be combined with any of the preceding configurations, before the step of attaching the adjustment mechanism, the adjustment mechanism can be oriented rotationally with respect to the compressor axis, wherein the rotational orientation may be carried out as desired. This makes assembly easier.

In configurations of the method which can be combined with any of the preceding configurations, the adjustment mechanism can be according to any of the preceding configurations.

In configurations of the method which can be combined with any of the preceding configurations, a bearing bushing can be introduced into the bore before the bearing section is fed through the bore (156) in the housing part. The bearing bushing can be pressed or injected into the bore here.

BRIEF DESCRIPTION OF THE FIGURES

FIGS. 4A-4F show different possible configurations of the (first/second) lever arm.

DETAILED DESCRIPTION

Figure 1:
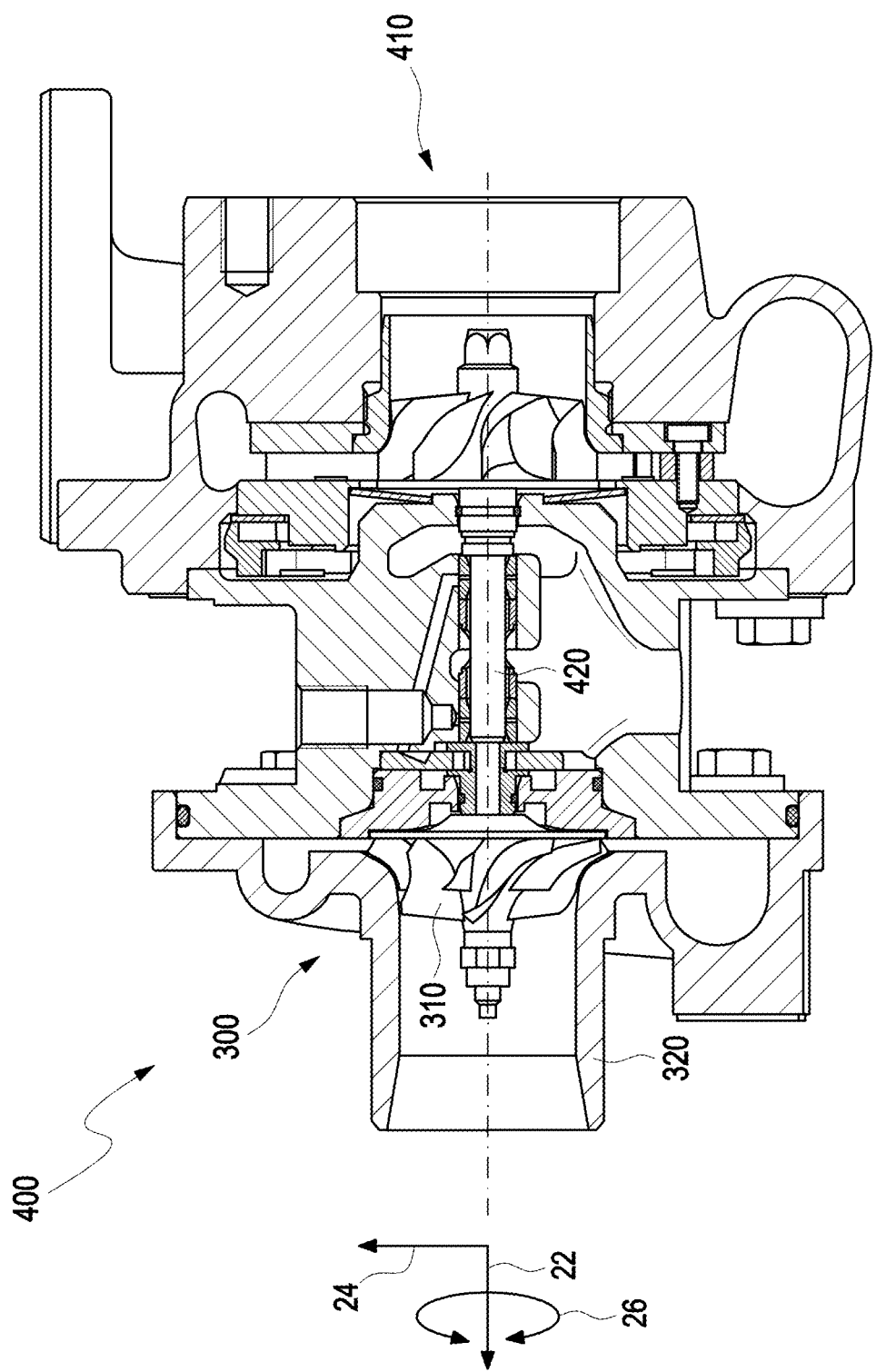
FIG. 1 shows a side sectional view of a charging device without an adjustment mechanism according to the invention.

In the context of this application, the expressions axial and axial direction relate to an axis of rotation of the adjustment ring/compressor/compressor inlet (all three have exactly the same axis) or to an axis of rotation of the bearing section of the lever assembly. These two axes are parallel to one another. Which of the two axes is meant should in each case be inferred from the context (and, if applicable, from the figures). With reference to the figures (see, for example, FIG. 1 or FIG. 3A), the axial direction of the adjustment ring/compressor/compressor inlet is indicated by the reference numeral 22. For clarity, the axial direction of the bearing section of the lever assembly is indicated by the reference numeral 22'. A radial direction 24 (24') relates to the axis 22 of the adjustment ring/compressor/compressor inlet (22' of the bearing section of the lever assembly) here. Similarly, a circumference or a circumferential direction 26 (26') relates to the axis 22 of the adjustment ring/compressor/compressor inlet (22' of the bearing section of the lever assembly) here.

FIG. 1 shows a charging device 400 with a drive unit 410 and a shaft 420 and a compressor 300. The compressor 300 comprises a compressor housing 320 in which a compressor wheel 310 is arranged. The compressor wheel 310 is coupled to the drive unit 410 via the shaft 420. The drive unit 410 is configured exclusively as a turbine here. In addition, the drive unit 410 could comprise an electric motor. Alternatively, the drive unit 410 could also exclusively comprise an electric motor without a turbine. Even though this is not shown in FIG. 1, the compressor 300 can comprise an adjustment mechanism 200 according to the invention or an actuation device 10 according to the invention which is explained in connection with the following figures.

Figure 2:
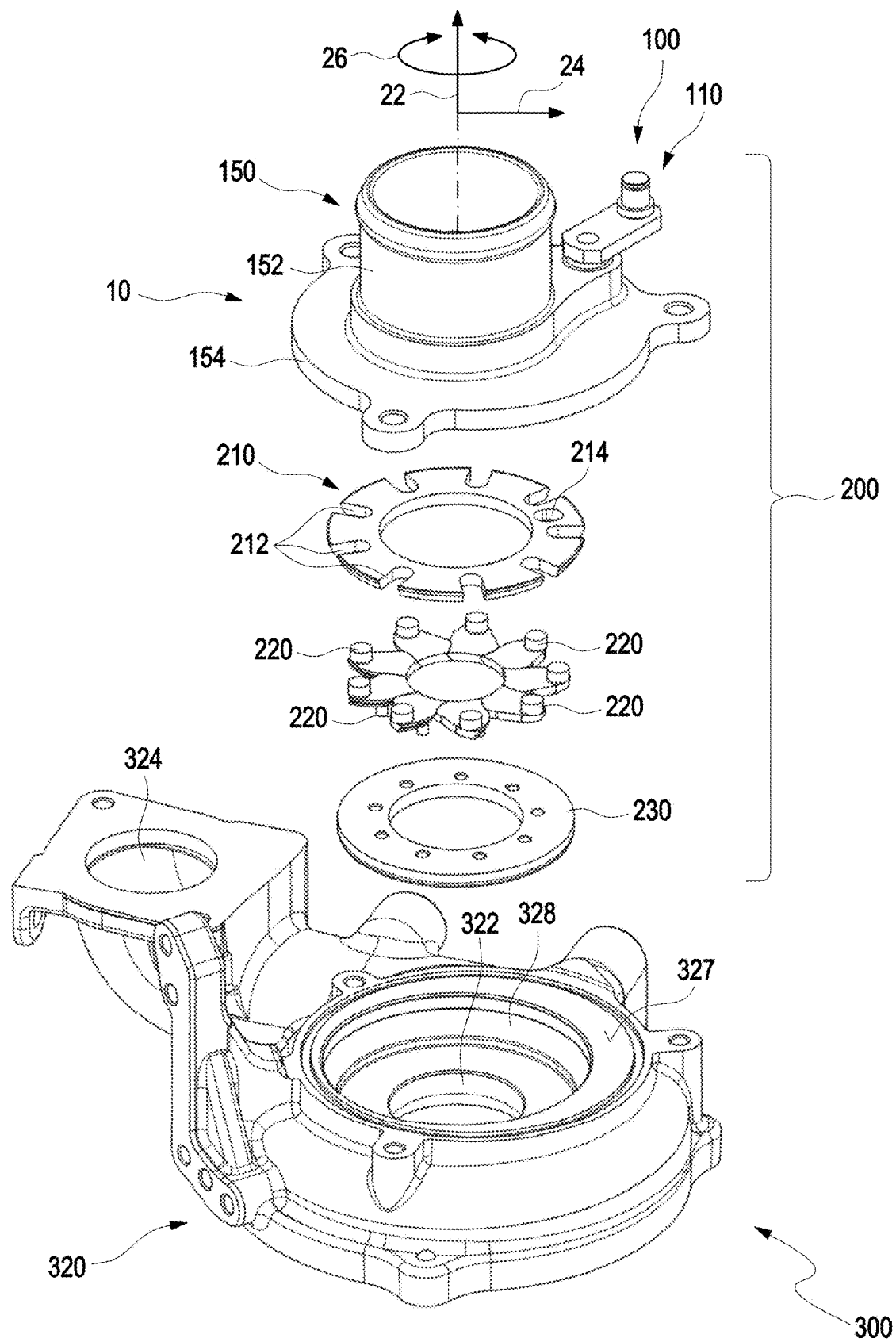
FIGS. 2A-2B show exploded representations of the compressor according to the invention with an adjustment mechanism and an actuation device looking obliquely from above and obliquely from below.
FIG. 2C shows the compressor according to the invention in a side sectional view.
Figure 2:
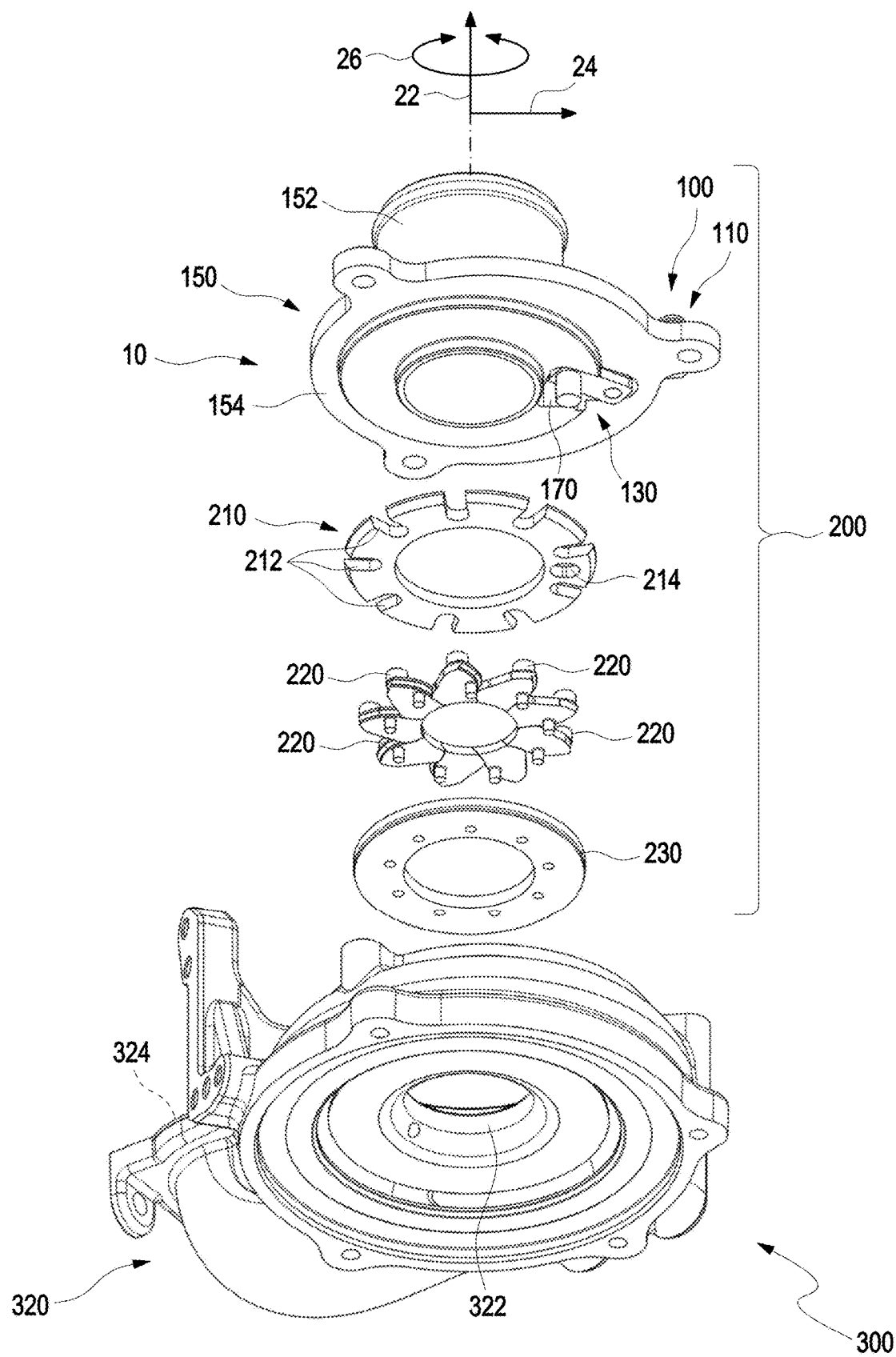
Figure 2:
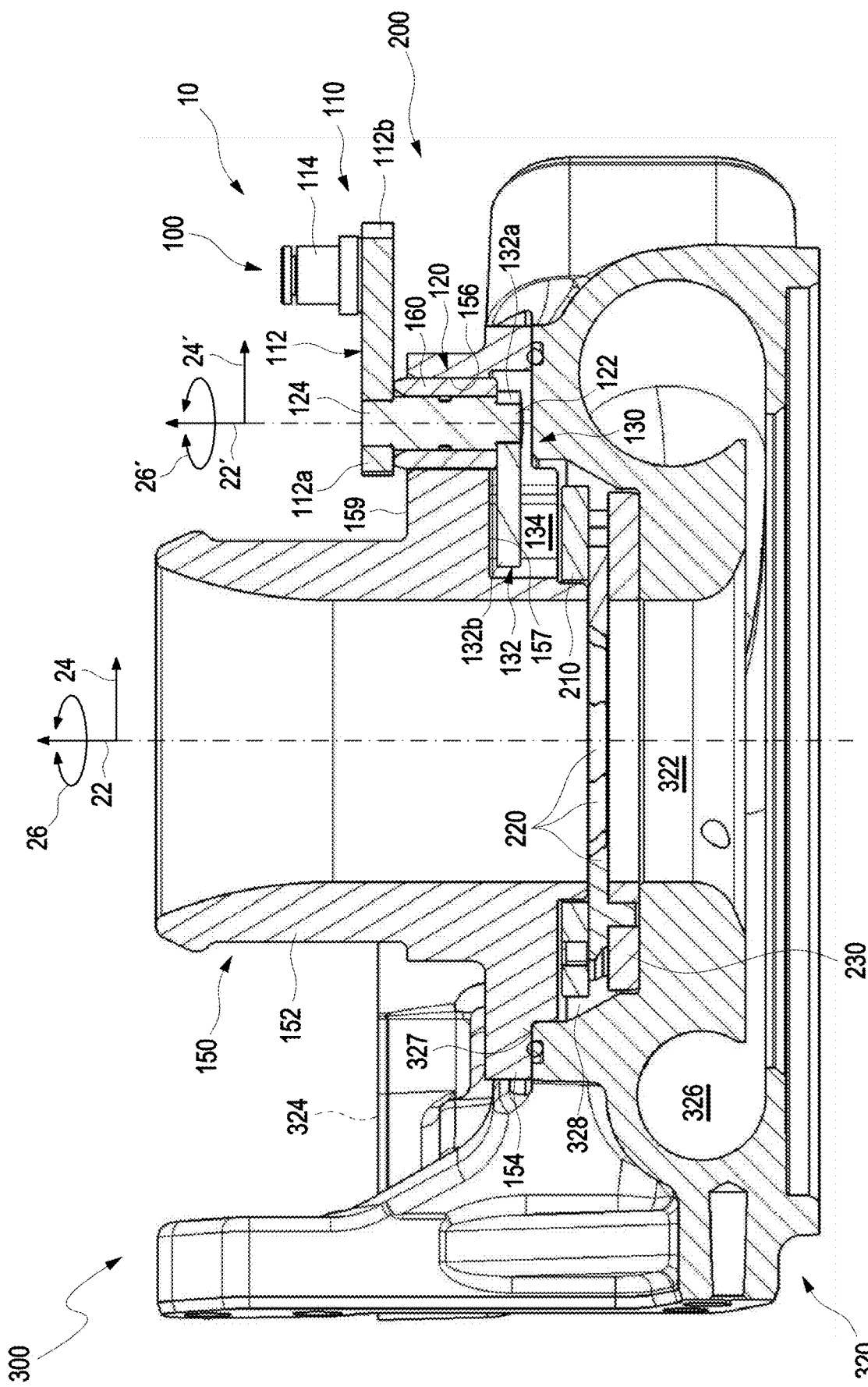

FIGS. 2A-2C show the compressor 300 now with the adjustment mechanism 200 for the variable adjustment of a compressor inlet 322. The compressor 300 comprises a compressor housing 320 and a compressor wheel 310 arranged therein (compressor wheel 310 only shown in FIG. 1). The compressor housing 320 defines the compressor inlet 322 and a compressor outlet 324 with a compressor volute 326 (see FIG. 2C). The compressor housing 320 comprises a flange face 327 for attaching an inlet nozzle 150. The compressor housing 320 further comprises a depression 328 coaxially surrounding the compressor inlet 322. The depression 328 is arranged radially inside the flange face 327 here. In other words, this means that the flange face 327 outwardly surrounds the depression 328 of the compressor housing 320 substantially coaxially or in a radial direction 24. The flange face 327 is raised relative to the depression 328 in an axial direction 22 here. The compressor can further comprise an actuator with an actuator rod (neither are shown here). The actuator can be coupled to a lever assembly via the actuator rod.

As can easily be seen from the exploded representations in FIGS. 2A-2B, the adjustment mechanism 200 which is configured for the variable adjustment of the compressor inlet 322 comprises an actuation device 10, an adjustment ring 210, a plurality of orifice plate elements 220 and a bearing ring 230. The orifice plate elements 220 are mounted rotatably in the bearing ring 230 and operatively coupled to the adjustment ring 210. The bearing ring 230 is configured to be arranged on the compressor housing 320. In particular, the bearing ring 230 is configured to be arranged or inserted in the coaxial depression 328 of the compressor housing 320. Similarly, the coaxial depression 328 is configured (for example dimensioned) optionally to accommodate the bearing ring 230. Put another way, this means that the bearing ring 230, the orifice plate elements 220 and the adjustment ring 210 are mounted in the coaxial depression 328. However, in alternative embodiments, the adjustment mechanism 200 can also comprise no bearing ring 230. In such an embodiment, the orifice plate elements 220 can be rotatably mounted directly in the compressor housing 320 (or in the coaxial depression 328). The compressor housing 320 or the coaxial depression 328 can be configured in such an embodiment only to accommodate the orifice plate elements 220 and the adjustment ring 210. The compressor housing 320 can, for example, have bores in the region of the coaxial depression 328 for the rotatable mounting of the orifice plate elements 220 here. The adjustment ring 210 comprises a plurality of orifice plate recesses 212 distributed in a circumferential direction 26 for coupling to the orifice plate elements 220. The orifice plate recesses 212 are configured to be groove-shaped and run in a substantially radial direction 24 here. A respective length of the orifice plate recesses 212 is limited inwardly and unlimited outwardly in a radial direction 24 here. Alternatively, the length of the orifice plate recesses 212 can also be limited outwardly and unlimited inwardly in a radial direction 24, or be limited both inwardly and outwardly in a radial direction 24.

Figure 3:
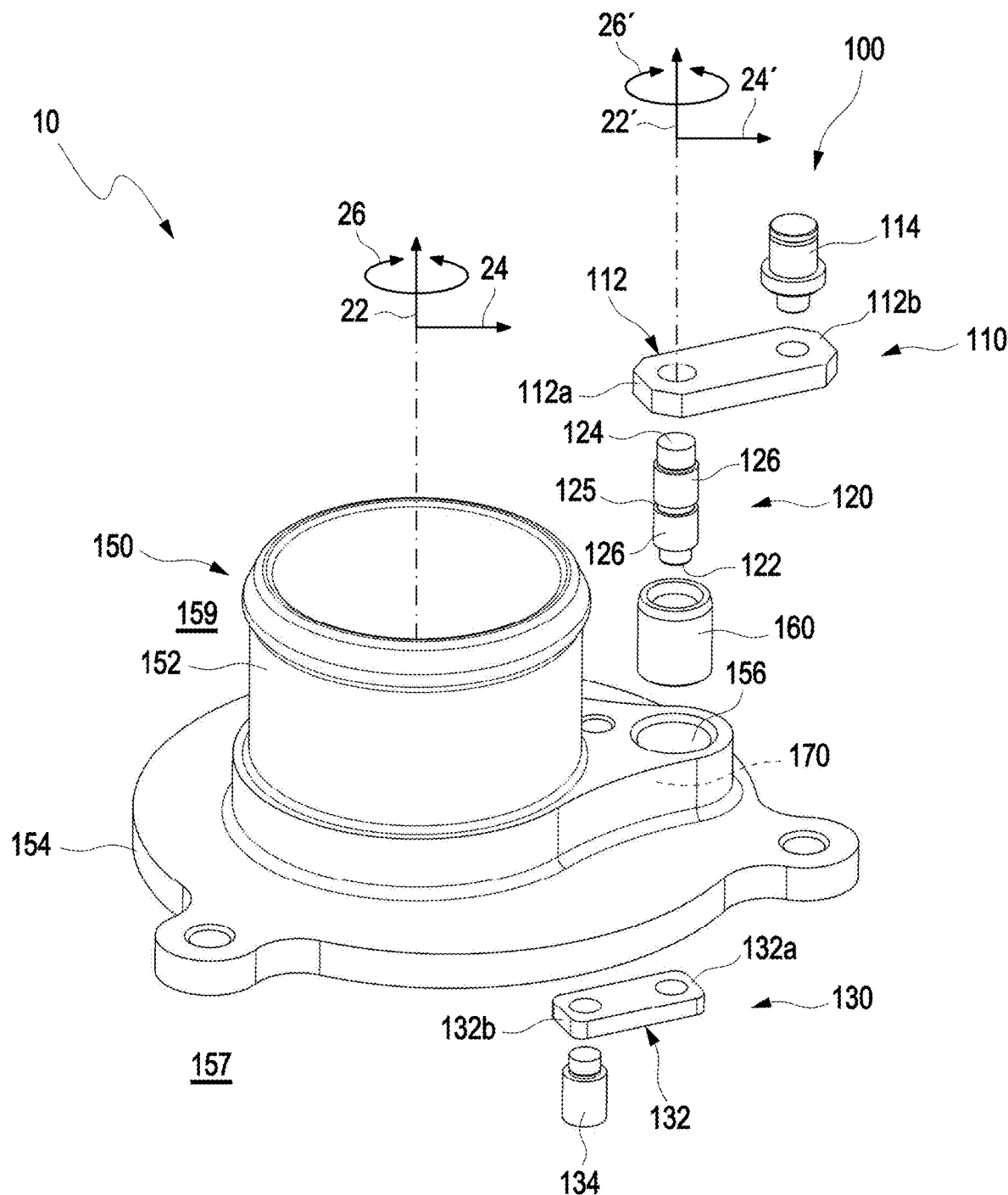
FIGS. 3A-3B show exploded representations of the actuation device according to the invention looking obliquely from above and obliquely from below.
FIG. 3C shows the actuation device according to the invention in a plan view from below, that is to say looking counter to the inlet direction (flow direction)
Figure 3:
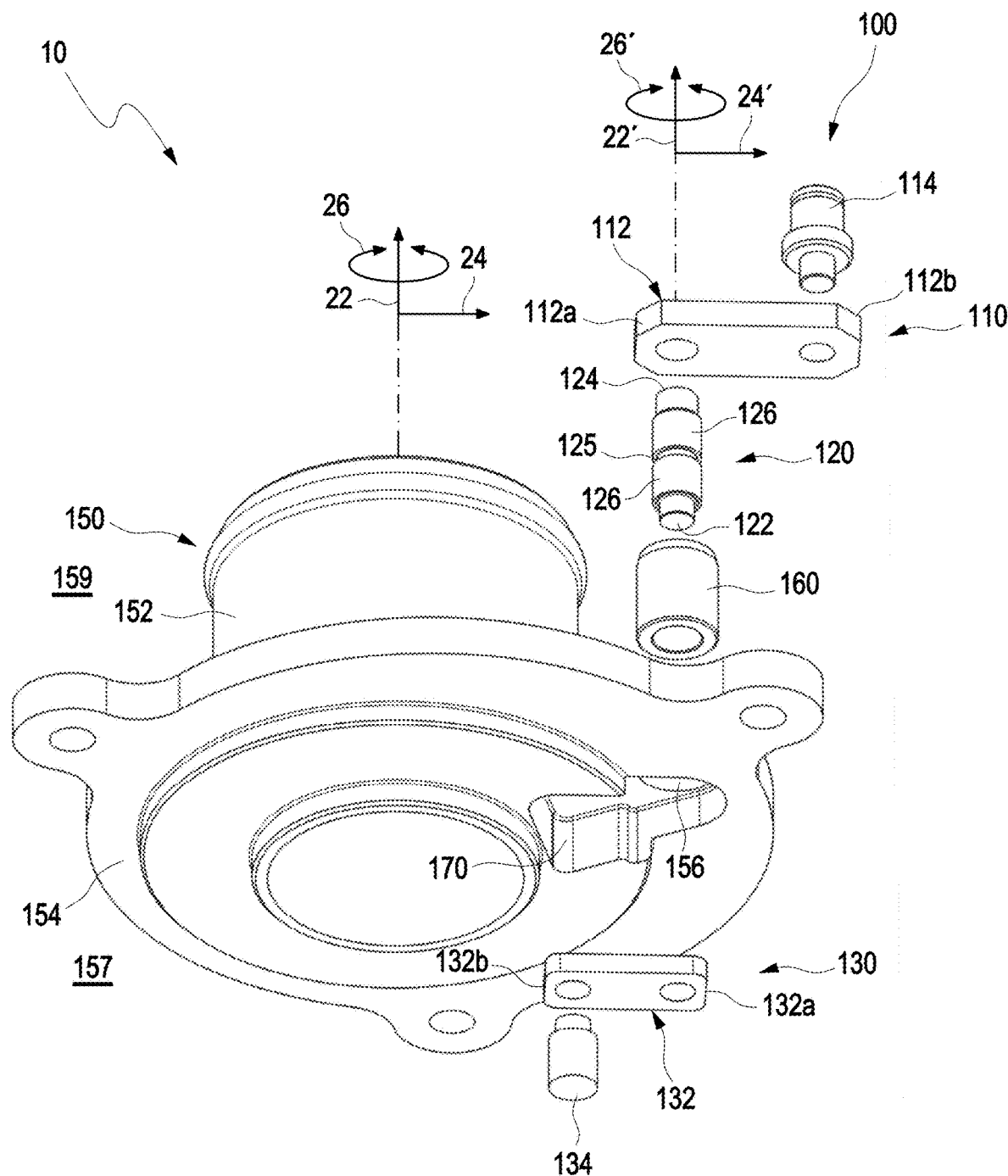
Figure 3:
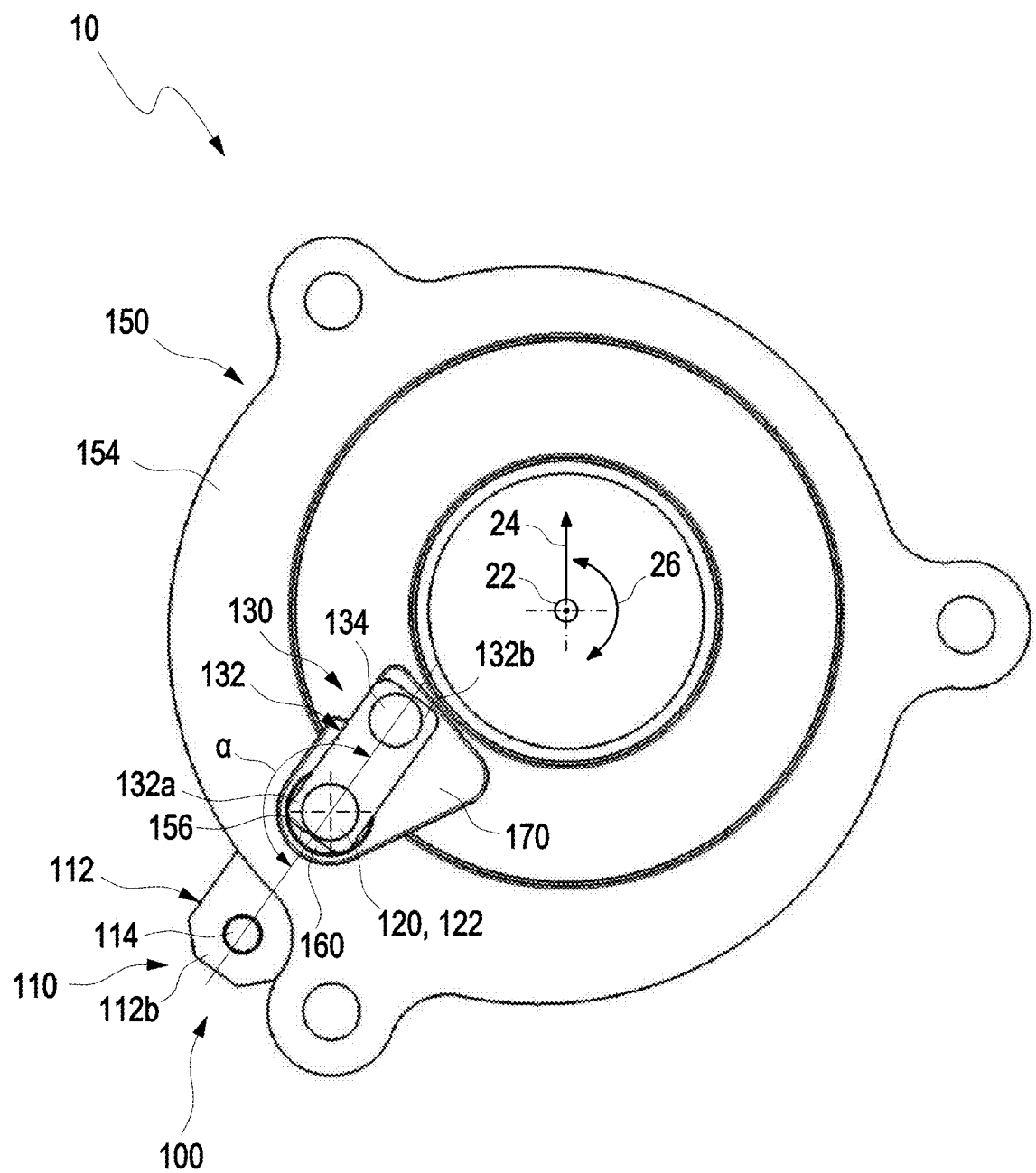

FIGS. 3A-3C show the actuation device 10 according to the invention. The actuation device 10 comprises a housing part 150 and a lever assembly 100. The lever assembly 100 comprises a bearing section 120, an input section 110 and an output section 130. The output section 130 is configured to be coupled to the adjustment ring 210 of the adjustment mechanism 200 on a first side 157 of the housing part 150 (cf. also FIG. 2B). The input section 110 with an actuator rod (not depicted) can be coupled on a second side 159 of the housing part 150. As can also be seen, in particular, in FIG. 2C, the lever assembly 100 is rotatably mounted in the housing part 150 via the bearing section 120 on the compressor inlet side here. It can also be seen that the first side 157 corresponds to a side inside the compressor 300 when the housing part 150 is installed. The second side 159 corresponds to a side outside the compressor 300 when the housing part 150 is installed here. On the compressor inlet side is to be understood here to mean a side which faces away from a bearing housing of the charging device 400 or the drive unit 410 of the charging device 400 starting from the compressor wheel 310. In more precise terms still, this is intended to mean a side relative to the adjustment ring 210 which faces away from the drive unit 410 of the charging device 400. Through the rotatable mounting of the lever assembly 100 in the housing part 150, a compact actuation device 10 can be provided. The possibility of individually coupling the output section 130 to the adjustment ring 210 and of individually coupling the input section 110 to the actuator rod simplifies the assembly process and provides greater flexibility.

FIGS. 3A-3B show the actuation device 10 with the lever assembly 100 in an exploded representation. As can be seen, the output section 130 comprises a first lever arm 132 with a first end region 132a and a second opposite end region 132b. Similarly, the input section 110 comprises a lever arm, more precisely a second lever arm 112 with a first end region 112a and a second opposite end region 112b. The bearing section 120 is configured to be substantially cylindrical and comprises a first end 122 and a second end 124. The first end 122 (when the bearing section 120 is installed) is arranged on the first side 157 of the housing part 150 and the second end 124 is arranged on the second side 159 of the housing part 150. End 157, 159 is to be understood here not just to be a (circular) surface finishing the bearing section 120, but a region which also serves for coupling to the input section or the output section 110, 130. The output section 130 is consequently arranged at the first end 122 of the bearing section 120. The input section 110 is accordingly arranged at the second end 124 of the bearing section 120.

As can also be seen (see FIGS. 3A-3B), the output section 130 and the input section 110 each comprise pins 134, 114. The pin 134 is arranged in the second end region 132b of the first lever arm 132 here. The output section 130 or the entire lever assembly 100 can be coupled to the adjustment ring 210 via the pin 134 here. More specifically, the pin 134 can enter into operative engagement with a corresponding recess in the adjustment ring 210 of the adjustment mechanism 200 here. For this purpose, the adjustment ring 210 comprises a coupling recess 214 for coupling to the lever assembly 100. This means that the coupling recess 214 is operatively coupled to the pin 134. The coupling recess 214 has a short groove-shaped course in a substantially radial direction 24. A length of the groove-shaped coupling recess 214 is limited inwardly and outwardly in a radial direction 24 here. Alternatively, the length of the groove-shaped coupling recess 214 can also be unlimited inwardly or outwardly in a radial direction 24 (that is to say open). Furthermore, the coupling recess 214 can also be other than groove-shaped, for example round, oval or s-shaped. A sliding path of the pin 134 of the output section 130 can hereby be set and therefore (inter alia) a limitation of a rotational path of the adjustment ring 210 can be determined. The coupling recess 214 penetrates the adjustment ring 210 in an axial direction 22. In alternative embodiments, the coupling recess 214 can also merely be made in the adjustment ring 210. The coupling recess 214 is arranged between two orifice plate recesses 212 in a circumferential direction 26. Alternatively, the adjustment ring can comprise a plurality of coupling recesses 214. These can be arranged in different positions in a circumferential direction 26 on the adjustment ring 210. Through this particularly advantageous configuration, the risk of tilting of the adjustment ring 210 can at least be reduced. Because the pin 134 engages into the coupling recess 214 of the adjustment ring 210, a force can be applied into the adjustment ring 210 at the level of the adjustment ring 210. The pin 134 can be configured as one part with the first lever arm 132 here or can be joined to the first lever arm 132 through a joining method, in particular a welding process. Alternatively, the pin 134 can also be connected to the lever arm 132 via another joining method, for example a press connection or a screw connection.

Alternatively to the pin 134, the second end region 132b of the first lever arm 132 can also have a recess (not shown). Via this recess, the output section 130 could enter into operative engagement with a corresponding elevation (e.g. a pin) in the adjustment ring 210 of the adjustment mechanism 200. This recess can, in particular, be configured to be fork-shaped here. This means that, in such an embodiment, the adjustment ring 210 would comprise a coupling elevation (not shown) which operatively couples to the recess (not shown) of the second end region 132b of the output section 130. In other words, the second end region 132b can be configured such that it comprises a recess (e.g. a fork-shaped recess). This recess can be configured here such that it couples directly to the adjustment ring 210 via the surface of the latter or its coupling elevation. The risk of tilting of the adjustment ring 210 can likewise be reduced hereby.

The pin 114 is arranged in the second end region 112b of the second lever arm 112 here (indicated in FIGS. 3A-3B). The input section 110 or the entire lever assembly 100 is coupled to the actuator rod via the pin 114 (not shown). More specifically, the pin 114 enters into operative engagement with a corresponding recess (e.g. a bore or eye—not shown) in the actuator rod here. The pin 114 is joined together with the second lever arm 112 through a joining method here, in particular a welding process. Alternatively, the pin 114 can be configured as one part with the second lever arm 112 here. The pin 114 can also be connected to the second lever arm 112 via another joining method, for example a press connection or a screw connection. Alternatively, the second end region 112b of the second lever arm 112 can also have a recess 113 (see FIG. 4F) through which the input section 110 can enter into operative engagement with a corresponding elevation (e.g. a pin) in the actuator rod. The recess 113 can, in particular, be configured to be fork-shaped here. In other words, the second end region 112b can be configured such that it comprises a recess 113 (e.g. a fork-shaped recess).

As can be seen in FIGS. 3A-3B, the elements of the actuation device 10 and, in particular, the elements of the lever assembly 100 are shown individually. As already mentioned, the elements of the input section 110 and/or of the output section 130 can be configured as one part or joined together. This in principle also applies to the bearing section 120, the input section 110 and the output section 130. This means that a joined assembly can be formed through the bearing section 120 and, for example, the input section 110. The two parts can therefore be coupled to one another through a joining process, in particular firmly coupled to one another. In particular, this can be a joined assembly which is formed through a welded connection. Furthermore, the bearing section 120 and the output section 130 can be formed in a joined assembly and can be coupled to one another through a joining process. This joined assembly can also be formed through a welded connection. Alternatively, also only either the input section 110 or the output section 130 can be formed in a joined assembly with the bearing section 120 and the other of either the input section 110 or the output section 130 respectively can be configured as one part with the bearing section 120. This means that the bearing section 120 can be produced jointly with the input section 110 or jointly with the output section 130 from one part, for example in an originally forming process. The joined assembly can consist of plastic material. Alternatively, the joined assembly can comprise a plastic material in a joining area, that is to say where the components 110, 120, 130 of the joined assembly are joined to one another. The joined assembly can be produced here, in particular, in an ultrasonic welding process.

As a result, the first lever arm 132 is firmly connected to the bearing section 120 via the first end region 132a. In other words, the output section 130 is connected to the first end 122 of the bearing section 120. As already mentioned, firmly connected can be understood here to mean a substance-to-substance bond such as via the joining methods referred to. Furthermore, depending on the configuration, the output section 130 or the first lever arm 132 can be configured as one part with the bearing section 120. The output section 130 or the first lever arm 132 can also be connected to the bearing section 130 via a screw connection or a press connection or other suitable joining methods. The second lever arm 112 is firmly connected to the bearing section 120 via the first end region 112a here. In other words, the input section 110 is connected to the second end 124 of the bearing section 120. As already mentioned, firmly connected can be understood here to mean a substance-to-substance bond such as via the joining methods referred to. Furthermore, depending on the configuration and, as already mentioned in connection with the output section 130, the input section 110 or the second lever arm 112 can be configured as one part with the bearing section 120. The input section 110 or the second lever arm 112 can also be connected to the bearing section 120 via a screw connection or a press connection or other suitable joining methods.

As can also be seen in FIGS. 3A-3B, the bearing section 120 comprises a circumferential groove 125. This circumferential groove 125 is formed through two cylindrical elevations 126. Alternatively, the circumferential groove 125 can also be formed through a corresponding depression. The circumferential groove 125 is arranged between the first end 122 and the second end 124. The circumferential groove can, as shown and preferred, be arranged relatively centrally between the first end 122 and the second end 124. However, alternatively, the circumferential groove 125 can also be arranged eccentrically between the first end 122 and the second end 124. The circumferential groove 125 should merely not be arranged too close to either the first end 122 or the second end 124. Through the cylindrical elevations 126, on the one hand, a reduction in the frictional surface whilst maintaining stability and, on the other, the creation of the circumferential groove 125 and, as a result, the possibility of installing a sealing ring (not shown) in the circumferential groove 125 can be achieved. This means that the bearing section 120 further comprises a sealing ring (not shown) which is arranged in the circumferential groove 125. Alternatively or in addition, a circumferential groove and/or a sealing ring can also be arranged in the material surrounding the bearing section 120 (e.g. bearing bushing 160 or housing part 150).

The housing part 150 comprises a cylindrical section 152 and a flange section (also flange) 154. The flange section 154 comprises a bore 156 in which the bearing section 120 is arranged. The actuation device 10 further comprises a bearing bushing 160 which is arranged in the bore 156 of the housing part 150 (see, in particular, FIGS. 3A-3B). The bearing section 120 is in turn rotatably mounted in the bearing bushing 160. Alternatively, the actuation device 10 can also comprise no bearing bushing 160. In such an embodiment, the bearing section 120 is rotatably mounted directly in the bore 156. In preferred embodiments, the bearing bushing 160 is pressed into the bore 156. Alternatively, the bearing bushing 160 and the bore 156 can have geometric features corresponding to one another in order to secure the bearing bushing 160 in a circumferential direction 26' and/or in an axial direction 22'. The bore 156 can be arranged in different positions on the flange section 154 between further inward in a radial direction 22 and further outward in a radial direction 22 here. Alternatively or in addition, the bearing bushing 160 can be made of a plastic material. The bearing bushing 160 can be injected into the bore 156 of the housing part 150 here.

As can be seen, in particular, in FIG. 3C, the input section 110 and the output section 130 are arranged at an angle α of approximately 180° relative to one another. The position of the angle α can be seen in FIG. 3C (lying in the drawing plane thereof) here. This means that the input section 110 and output section 130 protrude from the bearing section 120 in different directions (almost opposite) with respect to the axis of rotation 22' of the bearing section 120. In alternative embodiments, the angle α can also be selected differently. The angle α can be between 0° and 180° here. The angle α is preferably approximately 0° or approximately 180° (FIG. 3C). The input section 110 and the output section 120 could alternatively or in addition also be arranged in other angular planes differently or as it were, depending on the place of use or geometric conditions, relative to the bearing section 120. This provides a certain degree of flexibility both in the assembly and in the field of application. For example, identical parts could be used for different geometric conditions.

With respect to the configurations of the lever arms 112, 132 or their arrangement on the bearing section 120, FIGS. 4A-4F show schematic side views and associated plan views of in each case one example of a combination of different embodiments of the bearing section 120 and the input section 110. FIGS. 4A and 4B show the second lever arm 112 which is configured to be stepped and, as a coupling element, comprises pin 114 which is oriented in the opposite direction to the step or extends from the lever arm 112 in the opposite direction to the step. Alternatively, the pin 114 could also be oriented in another direction, in particular likewise in an axial direction of the arrow 22' from FIG. 4A. Similarly, the step could also be oriented in the opposite direction. FIGS. 4C and 4D show a second lever arm 112 which is configured to be s-shaped and, as a coupling element, comprises pin 114 which is oriented in the opposite direction to the S or extends from the lever arm 112 in the opposite direction to the S. Alternatively, the pin 114 could also be oriented in another direction, in particular likewise in an axial direction of the arrow 22' from FIG. 4C. Similarly, the S could also be oriented in the opposite direction. FIGS. 4E and 4F show the second lever arm 112 which is configured to be linear, protrudes obliquely from the bearing section 120 and, as a coupling element, for example, comprises a recess 113. Obliquely is understood to mean an angle that is not a right angle between the longitudinal extent of the bearing section 120 and the longitudinal extent of the lever arm 112. These are merely supposed to constitute exemplary embodiments and do not in any way limit the scope of the invention. Further combinations in addition to those mentioned here are conceivable. For example, the lever arm could be configured to be stepped, s-shaped or c-shaped or be configured in the form of a spline. A non-linear extent of the lever arm 112 seen in plan view in FIGS. 4A, 4D and 4F would also be conceivable (for example curved, kinked, etc.).

In particular, FIGS. 3B-3C show that the lever assembly 100 is rotationally limited. This is supposed to mean that a rotational adjustment path of the lever assembly 100 is limited. For this purpose, the actuation device 10 comprises a stopper 170. This stopper 170 is incorporated in the exemplary embodiment in FIGS. 3A-3C in the form of a depression in the housing part 150 (as a result, it is also referred to hereinbelow as a stopper depression 170 or as a depression 170). More specifically, the stopper 170 is incorporated in the form of a depression in the flange section 154. The stopper depression 170 is configured to be triangular. An elevation corresponding to the depression 170 is configured on the side of the flange section opposite in an axial direction 22. Alternatively and optionally, depending on the axial thickness of the flange section 154, the depression 170 can also be configured without any opposite elevation in the flange section 154. In the exemplary embodiment in FIGS. 3A-3C, the output section 130 or the first lever arm 132 is inserted into the stopper depression 170. The depression 170 defines an angular range which limits a maximum movement of the output section 130 (or the first lever arm 132) and/or input section 110 (or the second lever arm 112). A maximum movement of the entire lever assembly 100 can therefore also be limited. In alternative embodiments, the input section 110 or the second lever arm 112 can also be inserted into the stopper depression 170. In such an embodiment, the stopper depression 170 would have to be arranged on the axially opposite side of the flange section 154. In further alternative embodiments, the stopper 170 can in principle also be configured differently and, for example, comprise geometric elements which are configured to limit a rotational adjustment path of the lever assembly 100. For this purpose, the geometric elements can, for example, be arranged in the bearing section 120 and/or the bore 156 of the housing part 150 (or in the bearing bushing 160 if present). Alternatively or in addition, the geometric elements, such as a pin-shaped stopper, can also be arranged on the flange section 154 and/or on the input section 110 and/or on the output section 130. For example, one or a plurality of stoppers can be arranged on the flange section 154 through which the first and/or second lever arm 132, 112 can be limited in their movement here. The configurations described above can prevent over-rotation of the adjustment ring 210 and therefore lead to a more reliable actuation device 10 and adjustment mechanism 200. Furthermore, the risk of damage can hereby be reduced and an exact travel (and therefore adjustment path or degree of opening of the adjustment mechanism 200) can be set. In particular, the last-mentioned embodiments with a depression can lead to a more compact actuation device 10 since the axial dimensions of the actuation device 10 can be reduced, through the geometric "integration" of the output section 130 (or the first lever arm 132) and/or of the input section 110 (or the second lever arm 112) into the housing part 150, compared to a device in which the output section and/or the input section is arranged next to the housing part in a substantially axial direction.

As can be seen, in particular, from FIG. 3C, the housing part 150 serves as an inlet nozzle for the compressor housing 320 (so the housing part 150 can similarly also be designated as an inlet nozzle 150). The housing part 150 can be formed integrally with the compressor housing 320 or as a separate component here. The housing part 150 is attached to the flange face 327 of the compressor housing 320 on the compressor inlet side here. More specifically, the housing part 150 is attached to the flange face 327 of the compressor housing 320 via the flange section 154. This means that the present invention easily allows integration of an adjustment mechanism 200 into a compressor housing 320 or integration of an actuation device 10 into an inlet nozzle (housing part 150).

The invention further relates to a method of assembling a compressor 300 which comprises the following steps:
Providing a compressor housing 320;
Providing an adjustment mechanism 200 comprising:
Providing an actuation device 10 comprising:
Providing a housing part 150, a bearing section 120, an input section 110 and an output section 130;

Feeding the bearing section 120 through a bore 156 in the housing part 150;

Joining the bearing section 120 to at least either the input section 110 or the output section 130, preferably through a welding process; and Providing an assembly group consisting of a plurality of orifice plate elements 220, an adjustment ring 210 and optionally a bearing ring 230;

Attaching the adjustment mechanism 200 to the compressor housing 320.

The adjustment mechanism 200 can be arranged in any desired rotational orientation with respect to the axis of rotation of the compressor 300 before attachment here. This makes the method of assembly easier. Assembly errors associated herewith can also be eliminated. Furthermore, the actuation device 10 and the assembly group can be provided independently of one another. As a result, the overall assembly effort can be shared and the overall assembly time can be optimized since the subgroups can be provided in parallel. The attaching of the adjustment mechanism 200 can comprise first inserting the assembly group into the depression 328 of the compressor housing 320 and then fixing the actuation device 10 to the compressor housing 320. Alternatively, the actuation device 10 and the assembly group can be assembled together before attachment and jointly attached to the compressor housing 320. The bearing section 120 and either the input section 110 or the output section 130 can be provided as one part before the bearing section 120 is then fed through the bore 156 in the housing part 150 and then joined to the other of either the input section 110 or the output section 130. In other words, this means that either the input section 110 or the output section 130 can be provided as one part jointly with the bearing section 120. The bearing section 120 (jointly with either the input section 110 or the output section 130) can then be fed through the bore 156 in the housing part 150 and then joined to the other of either the input section 110 or the output section 130. When feeding through the bore 156, of course only the bearing section 120 itself is inserted into the bore 156. After being passed through or inserted, the section configured as one part with the bearing housing 120 (input section 110 or output section 130) can serve as a fixing aid when joining to the other section (input section 110 or output section 130). Alternatively to the provision of the bearing section 120 as one part with either the input section 110 or the output section 130, the latter can also be joined together before the bearing section 120 is then fed through the bore 156 in the housing part 150. This simplifies the assembly process. Furthermore, before the step of attaching the adjustment mechanism 200, the adjustment mechanism 200 can be oriented rotationally with respect to the compressor axis, wherein the rotational orientation can be carried out as desired. This makes assembly easier. Before the bearing section (120) is fed through the bore (156), a bearing bushing (160) can be introduced into the bore (156). The bearing bushing (160) can be pressed or injected into the bore (156) here.

Although the present invention has been described above and is defined in the attached claims, it should be understood that the invention may alternatively also be defined according to the following embodiments:

1. Actuation device (10) for a compressor inlet adjustment mechanism (200) comprising:
   a housing part (150); and
   a lever assembly (100) with a bearing section (120), an input section (110) and an output section (130); characterized in that
   the output section (130) is configured to be coupled to an adjustment ring (210) of the adjustment mechanism (200) on a first side (157) of the housing part (150) and in that the input section (110) can be coupled to an actuator rod on a second side (159) of the housing part (150), wherein the lever assembly (100) is rotatably mounted in the housing part (150) via the bearing section (120) on the compressor inlet side.

2. Actuation device (10) according to embodiment 1, characterized in that a joined assembly, in particular a joined assembly using a welded connection, is formed through the bearing section (120) and at least either the input section (110) or the output section (130).

3. Actuation device (10) according to embodiment 2, characterized in that a joined assembly, in particular a joined assembly using a welded connection, is formed through the bearing section (120) and the other of either the input section (110) or the output section (130) respectively, and alternatively wherein the bearing section (120) and the other of either the input section (110) or the output section (130) respectively are configured as one part.

4. Actuation device (10) according to either of embodiments 2 and 3, characterized in that the joined assembly consists of plastic material and is produced through an ultrasonic welding process.

5. Actuation device (10) according to any of the preceding embodiments, characterized in that the output section (130) has a first lever arm (132) with a first end region (132a) and a second opposite end region (132b), wherein the first lever arm (132) is firmly connected to the bearing section (120) via the first end region (132a).

6. Actuation device (10) according to any of the preceding embodiments, characterized in that the output section (130) is configured to enter into operative engagement with a corresponding recess (214) in the adjustment ring (210) of the adjustment mechanism (200) via a pin (134).

7. Actuation device (10) according to embodiment 6, if dependent on embodiment 5, characterized in that the pin (134) is arranged in the second end region (132b) of the first lever arm (132).

8. Actuation device (10) according to embodiment 5, characterized in that the second end region (132b) has a recess through which the output section (130) can enter into operative engagement with a corresponding elevation in the adjustment ring (210) of the adjustment mechanism (200).

9. Actuation device (10) according to any of the preceding embodiments, characterized in that the input section (110) and the output section (130) are mountable arranged at different angles α relative to one another.

10. Actuation device (10) according to embodiment 9, characterized in that the angle α can be between 0° and 180° and is preferably approximately 0° or approximately 180°.

11. Actuation device (10) according to any of the preceding embodiments, characterized in that the input section (110) has a second lever arm (112) with a first end region (112a) and a second opposite end region (112b), wherein the second lever arm (112) is firmly connected to the bearing section (120) via the first end region (112a).

12. Actuation device (10) according to embodiment 11, characterized in that the input section (110) is configured to enter into operative engagement with the actuator rod via a pin (114).

13. Actuation device (10) according to embodiment 12, characterized in that the pin (114) is arranged in the second end region (112b) of the second lever arm (112).

14. Actuation device (10) according to embodiment 11, characterized in that the second end region (112*b*) has a recess through which the input section (110) can enter into operative engagement with a corresponding elevation of the actuator rod.
15. Actuation device (10) according to any of the preceding embodiments, characterized in that the bearing section (120) is configured to be cylindrical.
16. Actuation device (10) according to any of the preceding embodiments, characterized in that the bearing section (120) has a first end (122) and a second end (124), wherein the first end (122) is arranged on the first side (157) of the housing part (150) and wherein the second end (124) is arranged on the second side (159) of the housing part (150).
17. Actuation device (10) according to embodiment 16, characterized in that the output section (130) is arranged at the first end (122) of the bearing section (120) and in that the input section (110) is arranged at the second end (124) of the bearing section (120).
18. Actuation device (10) according to any of the preceding embodiments, characterized in that the housing part (150) has a cylindrical section (152) and a flange section (154).
19. Actuation device (10) according to embodiment 18, characterized in that the flange section (154) comprises a bore (156) in which the bearing section (120) is arranged.
20. Actuation device (10) according to embodiment 19, further comprising a bearing bushing (160) in which the bearing section (120) is rotatably mounted.
21. Actuation device (10) according to embodiment 20, characterized in that the bearing bushing (160) is arranged in the bore (156) of the housing part (150), wherein the bearing bushing (160) is preferably pressed into the bore (156), or wherein the bearing bushing (160) and the bore (156) have geometrical features corresponding to one another in order to secure the bearing bushing (160) rotationally and/or axially.
22. Actuation device (10) according to either of embodiments 20 and 21, characterized in that the bearing bushing (160) is arranged in the bore (156) of the housing part (150), wherein the bearing bushing (160) is made of a plastic material and injected into the bore (156).
23. Actuation device (10) according to any of the preceding embodiments, characterized in that the lever assembly (100) is rotationally limited.
24. Adjustment mechanism (200) for the variable adjustment of a compressor inlet (22) comprising:
    an adjustment ring (210),
    a plurality of orifice plate elements (220) which are rotatably mounted and operatively coupled to the adjustment ring (210);
    characterized in that
    the adjustment mechanism (200) comprises an actuation device (10) according to any of the preceding embodiments.
25. Adjustment mechanism (200) according to embodiment 24, further comprising a bearing ring (230) in which the orifice plate elements (220) are rotatably mounted, or wherein the orifice plate elements (220) are rotatably mounted in a compressor housing (320).
26. Adjustment mechanism (200) according to either of embodiments 24 and 25, characterized in that the adjustment ring (210) comprises a plurality of orifice plate recesses (212) distributed in a circumferential direction (26) for coupling to the orifice plate elements (220).
27. Adjustment mechanism (200) according to any of embodiments 24 to 26, characterized in that the adjustment ring (210) comprises at least one coupling recess (214) and preferably precisely one coupling recess (214) for coupling to the lever assembly (100).
28. Adjustment mechanism (200) according to embodiment 27, characterized in that the coupling recess (214) follows a groove-shaped course in a substantially radial direction (24).
29. Adjustment mechanism (200) according to embodiment 28, characterized in that a length (214*a*) of the groove-shaped coupling recess (214) is limited inwardly and/or outwardly in a radial direction (24).
30. Adjustment mechanism (200) according to any of embodiments 27 to 29, characterized in that the coupling recess (214) penetrates the adjustment ring (210) in an axial direction (22).
31. Adjustment mechanism (200) according to any of embodiments 27 to 30 and if the output section (130) comprises a pin (134), characterized in that the pin (134) is operatively coupled to the coupling recess (214).
32. Adjustment mechanism (200) according to either of embodiments 27 and 31, characterized in that the coupling recess (214) is arranged between two orifice plate recesses (212) respectively in a circumferential direction (26).
33. Adjustment mechanism (200) according to any of embodiments 24 to 26 and if the second end region (132*b*) of the output section (130) has a recess, characterized in that the adjustment ring (210) comprises a coupling elevation which is operatively coupled to the recess of the second end region (132*b*) of the output section (130).
34. Compressor (300) comprising:
    a compressor housing (320) and a compressor wheel (310) arranged therein, wherein the compressor housing (320) defines a compressor inlet (322) and a compressor outlet (324) with a compressor volute (326);
    characterized in that the compressor (300) comprises an adjustment mechanism (200) according to any of the preceding embodiments.
35. Compressor (300) according to embodiment 34, characterized in that the housing part (150) serves as an inlet nozzle of the compressor housing (320) and is attached to a flange face (327) of the compressor housing (320) on the compressor inlet side.
36. Compressor (300) according to either of embodiments 34 and 35, characterized in that the compressor housing (320) has a depression (328) coaxially surrounding the compressor inlet (322) to accommodate the orifice plate elements (220), the adjustment ring (210) and optionally the bearing ring (230).
37. Compressor (300) according to any of embodiments 34 to 36, further comprising an actuator with an actuator rod via which the actuator is coupled to the lever assembly (100).
38. Charging device (400) comprising:
    a drive unit (410); and
    a shaft (420);
    characterized by a compressor (300) according to any of the preceding embodiments, wherein the compressor wheel (310) of the compressor (300) is coupled to the drive unit (410) via the shaft (420).
39. Charging device (400) according to embodiment 38, characterized in that the drive unit (410) comprises a turbine and/or an electric motor.
40. Method of assembling a compressor (300) comprising the following steps:
    Providing a compressor housing (320);
    Providing an adjustment mechanism (200) comprising:

Providing an actuation device (10) comprising:
  Providing a housing part (150), a bearing section (120), an input section (110) and an output section (130);
  Feeding the bearing section (120) through a bore (156) in the housing part (150);
  Joining the bearing section (120) to at least either the input section (110) or the output section (130), preferably through a welding process; and
Providing an assembly group consisting of a plurality of orifice plate elements (220), an adjustment ring (210) and optionally a bearing ring (230);
attaching the adjustment mechanism (200) to the compressor housing (320).

41. Method according to embodiment 40, wherein the adjustment mechanism (200) is arranged in any desired rotational orientation with respect to the axis of rotation of the compressor (300) before attachment.
42. Method according to either of embodiments 40 and 41, wherein the actuation device (10) and the assembly group are provided independently of one another.
43. Method according to either of embodiments 40 and 42, wherein the attaching of the adjustment mechanism (200) comprises first inserting the assembly group into a depression (328) in the compressor housing (320) and then fixing the actuation device (10) to the compressor housing (320), or wherein the actuation device (10) and the assembly group are assembled together before attachment and jointly attached to the compressor housing (320).
44. Method according to any of embodiments 40 to 43, characterized in that the bearing section (120) and either the input section (110) or the output section (130) are provided as one part before the bearing section (120) is then fed through the bore (156) in the housing part (150) and then joined to the other of either the input section (110) or the output section (130).
45. Method according to any of embodiments 40 to 44, characterized in that, before the step of attaching the adjustment mechanism (200), the adjustment mechanism (200) is oriented rotationally with respect to the compressor axis, wherein the rotational orientation can be carried out as desired.
46. Method according to any of embodiments 40 to 45, characterized by an adjustment mechanism (200) according to any of the preceding embodiments.
47. Method according to any of embodiments 40 to 46, characterized in that a bearing bushing (160) is introduced into the bore (156) before the bearing section (120) is fed through the bore (156) in the housing part (150).
48. Method according to embodiment 47, characterized in that the bearing bushing (160) is pressed or injected into the bore (156).

The invention claimed is:

1. An adjustment mechanism (200) for variable adjustment of a compressor inlet (22) comprising:
  a rotationally moveable adjustment ring (210); and
  a plurality of orifice plate elements (220) which are rotatably mounted and operatively coupled to the adjustment ring (210);
  wherein the adjustment mechanism (200) comprises an actuation device (10) comprising:
    a housing part (150); and
    a lever assembly (100) with a bearing section (120), an input section (110) and an output section (130);
  wherein the output section (130) is configured to be coupled to the adjustment ring (210) of the adjustment mechanism (200) on a first side (157) of the housing part (150) and in that the input section (110) can be coupled to an actuator rod on a second side (159) of the housing part (150), wherein the lever assembly (100) is rotatably mounted in the housing part (150) via the bearing section (120) on an inlet side of the compressor, and wherein an axis of rotation (22') of the bearing section (120) is parallel to a compressor axis of the compressor inlet (22).

2. The adjustment mechanism (200) according to claim 1, wherein a joined assembly is formed through the bearing section (120) and at least either the input section (110) or the output section (130).

3. The adjustment mechanism (200) according to claim 2, wherein a second joined assembly is formed through the bearing section (120) and the other of either the input section (110) or the output section (130) respectively.

4. The adjustment mechanism (200) according to claim 3, wherein the joined assembly comprises a welded connection.

5. The adjustment mechanism (200) according to claim 3, wherein the bearing section (120) and the other of either the input section (110) or the output section (130) respectively are configured as one part.

6. The adjustment mechanism (200) according to claim 2, wherein the joined assembly comprises a welded connection.

7. The adjustment mechanism (200) according to claim 1, wherein the output section (130) has a first lever arm (132) with a first end region (132a) and a second opposite end region (132b), wherein the first lever arm (132) is firmly connected to the bearing section (120) via the first end region (132a).

8. The adjustment mechanism (200) according to claim 1, wherein the output section (130) is configured to enter into operative engagement with a corresponding recess (214) in the adjustment ring (210) of the adjustment mechanism (200) via a pin (134).

9. The adjustment mechanism (200) according to claim 1, wherein the bearing section (120) has a first end (122) and a second end (124), wherein the first end (122) is arranged on the first side (157) of the housing part (150) and wherein the second end (124) is arranged on the second side (159) of the housing part (150).

10. The adjustment mechanism (200) according to claim 9, wherein the output section (130) is arranged at the first end (122) of the bearing section (120) and in that the input section (110) is arranged at the second end (124) of the bearing section (120).

11. The adjustment mechanism (200) according to claim 1, wherein the housing part (150) has a cylindrical section (152) and a flange section (154).

12. The adjustment mechanism (200) according to claim 11, wherein the flange section (154) comprises a bore (156) in which the bearing section (120) is arranged.

13. The adjustment mechanism (200) according to claim 1, wherein the lever assembly (100) is rotationally limited.

14. The adjustment mechanism (200) according to claim 1, wherein the adjustment ring (210) comprises at least one coupling recess (214) and preferably precisely one coupling recess (214) for coupling to the lever assembly (100).

15. The adjustment mechanism (200) according to claim 14, wherein the coupling recess (214) follows a groove-shaped course in a substantially radial direction (24).

16. A compressor (300) comprising:
  a compressor housing (320) and a compressor wheel (310) arranged therein, wherein the compressor housing (320) defines a compressor inlet (322) and a compressor outlet (324) with a compressor volute (326);

wherein the compressor (300) comprises the adjustment mechanism (200) according to claim 1.

17. A charging device (400) comprising:
a drive unit (410); and
a shaft (420);
the compressor (300) according to claim 16, wherein the compressor wheel (310) of the compressor (300) is coupled to the drive unit (410) via the shaft (420).

18. A method of assembling a compressor (300) comprising the following steps:
providing a compressor housing (320);
providing an adjustment mechanism (200) comprising:
providing an actuation device (10) comprising:
providing a housing part (150), a bearing section (120), an input section (110) and an output section (130);
feeding the bearing section (120) through a bore (156) in the housing part (150);
joining the bearing section (120) to at least either the input section (110) or the output section (130); and
providing an assembly group consisting of a plurality of orifice plate elements (220) which are rotatably mounted and operatively coupled to an adjustment ring (210); and
attaching the adjustment mechanism (200) to the compressor housing (320).

19. The method according to claim 18, wherein the bearing section (120) and either the input section (110) or the output section (130) are provided as one part before the bearing section (120) is then fed through the bore (156) in the housing part (150) and then joined to the other of either the input section (110) or the output section (130).

20. The method according to claim 18, wherein the bearing section (120) is joined to at least either the input section (110) or the output section (130) through a welding process.

21. The method according to claim 18, wherein the provided assembly group further consists of a bearing ring (230).

* * * * *